(12) United States Patent
Noriega Gonzalez et al.

(10) Patent No.: US 9,841,073 B2
(45) Date of Patent: Dec. 12, 2017

(54) VENTILATED BRAKE ROTORS

(71) Applicant: FORD GLOBAL TECHNOLOGIES, LLC, Dearborn, MI (US)

(72) Inventors: Luis Manuel Noriega Gonzalez, Distrito Federal (MX); Juan Carlos Martinez Laurent, Toluca (MX); Jorge Silvestre Guerra Meza, Cuautitlan Izcalli (MX); Francisco Alejandro Canales Monte, Huixquilucan (MX); Joel Alcantar Garcia, Mexico (MX); Luis Ricardo Avila Magana, Cuautitlan Izcalli (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/186,635

(22) Filed: Jun. 20, 2016

(65) Prior Publication Data

US 2016/0298709 A1    Oct. 13, 2016

Related U.S. Application Data

(63) Continuation of application No. 14/299,808, filed on Jun. 9, 2014, now Pat. No. 9,371,875.

(51) Int. Cl.
*F16D 65/12* (2006.01)
*F16D 65/847* (2006.01)
*F16D 65/02* (2006.01)

(52) U.S. Cl.
CPC ......... *F16D 65/128* (2013.01); *F16D 65/847* (2013.01); *F16D 2065/1328* (2013.01);
(Continued)

(58) Field of Classification Search
CPC .. F16D 65/128; F16D 65/847; F16D 2065/78; F16D 2065/788;
(Continued)

(56) References Cited

U.S. PATENT DOCUMENTS 2,411,067 A * 11/1946 Tack ............... F16D 65/128
                                                188/218 XL
4,263,992 A    4/1981 Moore et al.
(Continued)

OTHER PUBLICATIONS

Non-Final Office Action dated Jun. 26, 2015 from U.S. Appl. No. 14/299,808.
(Continued)

*Primary Examiner* — Vishal Sahni
(74) *Attorney, Agent, or Firm* — Jones Robb, PLLC; Raymond L. Coppiellie (57) ABSTRACT

A brake rotor for attachment to a wheel of a vehicle may include outer and inner friction members, and a plurality of fin elements connecting the outer friction member to the inner friction member. Each fin element may include radially spaced first and second pillars that are connected by a single bridge portion to define an opening in the fin element. The opening may also be defined by an interior surface of one of the annular disks. The opening may be tapered along an entire length between a first pillar and a second pillar. A width of each fin element may taper toward a center of the brake rotor.

22 Claims, 7 Drawing Sheets (52) U.S. Cl.
CPC ............. *F16D 2065/1344* (2013.01); *F16D 2250/0007* (2013.01); *F16D 2250/0084* (2013.01); *Y10T 29/49828* (2015.01)

(58) Field of Classification Search
CPC ..... F16D 2065/1328; F16D 2065/1344; F16D 2250/0007; F16D 2250/0084
USPC .................................................. 188/218 XL
See application file for complete search history.

(56) References Cited

U.S. PATENT DOCUMENTS

| | | | |
|---|---|---|---|
| 5,184,663 A * | 2/1993 | Oono ..................... | B22D 19/00 164/112 |
| 5,544,726 A | 8/1996 | Topouzian et al. | |
| 6,443,269 B1 | 9/2002 | Rancourt | |
| 6,536,564 B1 * | 3/2003 | Garfinkel ................ | F16D 65/12 188/218 XL |
| 7,934,586 B1 * | 5/2011 | Black .................... | F16D 65/123 188/218 XL |
| 8,336,682 B2 | 12/2012 | Mears et al. | |
| 9,371,875 B2 * | 6/2016 | Noriega Gonzalez ............. | F16D 65/847 |
| 2010/0206675 A1 * | 8/2010 | Miyake ................... | F16D 65/12 188/218 XL |
| 2011/0100774 A1 | 5/2011 | Seuser et al. | |
| 2011/0214950 A1 * | 9/2011 | Fujimoto ................ | B61H 5/00 188/218 XL |

OTHER PUBLICATIONS

Response to Non-Final Office Action dated Sep. 28, 2015 from U.S. Appl. No. 14/299,808.
Final Office Action dated Oct. 8, 2015 from U.S. Appl. No. 14/299,808.
Response to Final Office Action dated Jan. 5, 2016 from U.S. Appl. No. 14/299,808.
Advisory Action dated Jan. 22, 2016 from U.S. Appl. No. 14/299,808.
Notice of Allowance dated Feb. 22, 2016 from U.S. Appl. No. 14/299,808.

* cited by examiner

VENTILATED BRAKE ROTORS

RELATED APPLICATIONS

This application is a continuation application of U.S. application Ser. No. 14/299,808, filed Jun. 9, 2014, the entire contents of which is incorporated by reference herein.

TECHNICAL FIELD

The present disclosure relates generally to vehicle brake rotors. More specifically, the present disclosure relates to ventilated brake rotors with heat dissipation fins and methods of manufacturing such rotors.

BACKGROUND

Brake rotors, or brake disks, are arranged to be mounted to and rotate with a wheel hub of a vehicle as part of the vehicle's braking system. Brake rotors, for example, generally include two oppositely-facing annular friction surfaces which, during operation of the brakes, are engaged by two blocks of friction material (e.g., brake pads) that are moved towards one another into contact with the two friction surfaces so that frictional forces occur and slow the rotation of the rotor, and hence the wheel of the vehicle. These frictional forces, however, may also cause the rotors, brake pads, and caliper (which houses the brake pads and fits over the rotor) to become very hot, which may lead to reduced braking efficiency. High temperatures, for example, may cause problems such as brake fade (temporary loss of braking due to the reduction of the friction coefficient between the friction material and the brake rotor), brake fluid vaporization, component wear (including thermal deformation of the brake rotors), and thermal judder (vibrations that the driver can feel and hear).

In order to reduce temperature/heat accumulation in the brake rotors that is caused by the frictional forces, rotors may include, for example, vents that are cast into the edge of the rotor to allow the heat that has built up on the metal of the rotor to escape. Conventional ventilated rotors may include, for example, friction members (which carry the oppositely-facing annular friction surfaces) that are arranged in a spaced-apart parallel relationship. The friction members are joined by vanes or fins therebetween, which form cooling ducts extending radially and outwardly of the rotor. The cooling ducts are arranged so that, as the rotor is rotated, air passes through the ducts and acts to cool the friction members.

Although such ventilated rotor designs provide some heat dissipation from the rotor (to help cool the friction members), the heat dissipation provided is limited by the amount of fin surface area exposed to the air flow passing through the ducts. The air flow through each duct is, for example, only exposed to one side of each fin, thereby limiting the amount of convective heat dissipation provided by each fin.

It may, therefore, be advantageous to provide a ventilated brake rotor with an enlarged heat dissipation area to dissipate more heat energy from the rotor. It may also be advantageous to provide a ventilated brake rotor design that reduces the mass of the rotor.

SUMMARY

In accordance with various exemplary embodiments, a brake rotor includes outer and inner friction members, and a plurality of fin elements connecting the outer friction member to the inner friction member. Each fin element includes radially spaced first and second pillars that are connected by a single bridge portion to define an opening in the fin element. A width of each fin element tapers toward a center of the brake rotor.

In accordance with various additional exemplary embodiments, a brake rotor includes outer and inner annular disks, and a plurality of fin elements extending radially between the annular disks and connecting the outer disk to the inner disk. Each fin element includes first and second pillars, a bridge portion connecting the first and second pillars, and an opening. The opening is defined by the first and second pillars, the bridge portion, and an interior surface of one of the annular disks.

In accordance with another aspect of the present disclosure, a brake rotor includes a plurality of fin elements disposed between outer and inner friction members of the brake rotor such that a lengthwise direction of each fin extends radially from a center of the brake rotor. Each fin element includes an opening, the opening being tapered along an entire length between a first pillar and a second pillar.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates a ventilated brake rotor having an innovative fin design that may both reduce the mass of the rotor and improve the heat dissipation capacity of the rotor. For instance, the exemplary embodiments described herein utilize fin elements having an increased heat dissipation area (i.e., the area of each fin that is in contact with air flowing through each ventilation channel of the rotor). Various exemplary embodiments described herein, for example, contemplate a ventilated brake rotor comprising a plurality of fin elements, each fin element having first and second pillars that are connected by a bridge portion to define an opening in the fin element that may allow air to pass through the fin element. In this manner, as the rotor is rotated, an air flow path may be created both along a length of each fin element (i.e., between the fin elements) and across a width of each fin element (i.e., through the fin elements), thereby also generating turbulence across the fin elements to dissipate heat from the rotor. Furthermore, removing a portion of each fin element (i.e., to form the opening in each fin element) reduces the mass of each fin element, and the overall mass of the rotor itself.

FIGS. 1-5 illustrate an exemplary embodiment of a ventilated brake rotor 100 in accordance with the present disclosure. The brake rotor 100 includes an outer friction member 102 that is connected to an inner friction member 104 by a plurality of fin elements 106, 108. The brake rotor 100, for example, further includes a hub mounting surface 110 that extends from the outer friction member 102 to connect the brake rotor 100 to a wheel (not shown) of a motor vehicle (not shown). As best shown in the cross-sectional view of FIG. 3, the hub mounting surface 110 may be connected to the outer friction member 102 of the rotor 100 via, for example, a neck portion 111. The hub mounting surface 110 may, for example, include a plurality of bore holes 113, which are configured to receive lug bolts (not shown) to attach the rotor 110 to the wheel of the motor vehicle. In this manner, the outer friction member 102 is configured to face away from the vehicle when the rotor 100 is attached to the wheel, and the inner friction member 104 is configured to face towards the vehicle when the rotor 100 is attached to the wheel.

Figure 1:
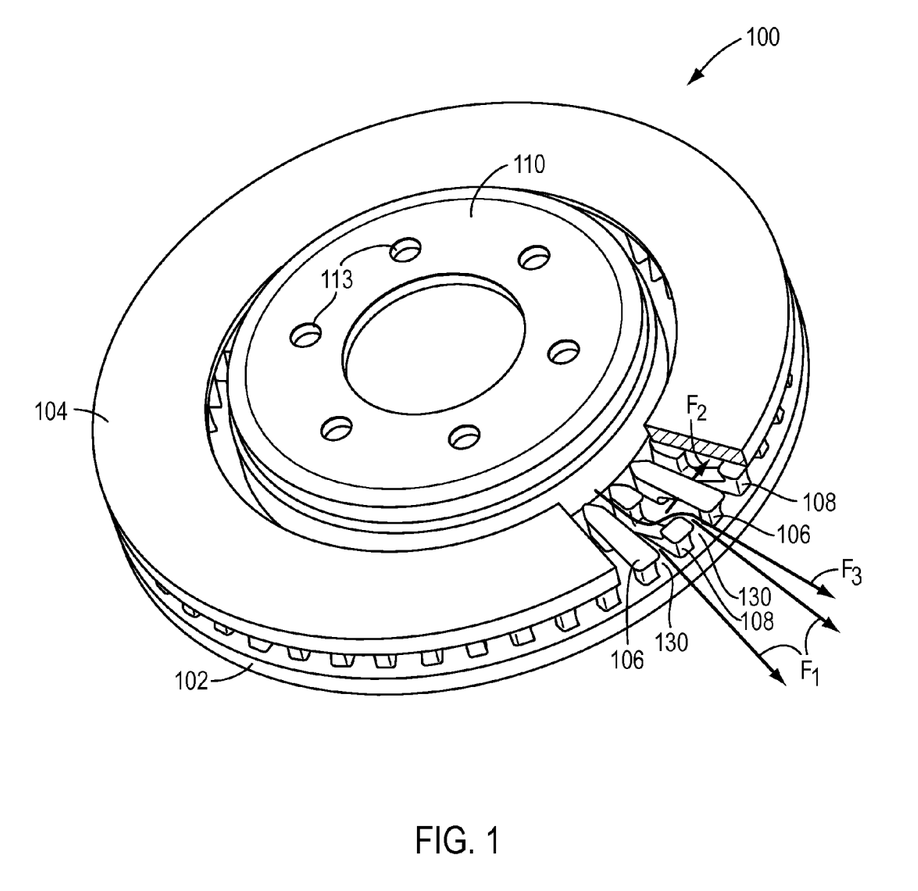
FIG. 1 is a perspective view of an exemplary embodiment of a ventilated brake rotor in accordance with the present disclosure, with a portion of an inner friction member of the rotor broken away to show fin elements.
Figure 2:
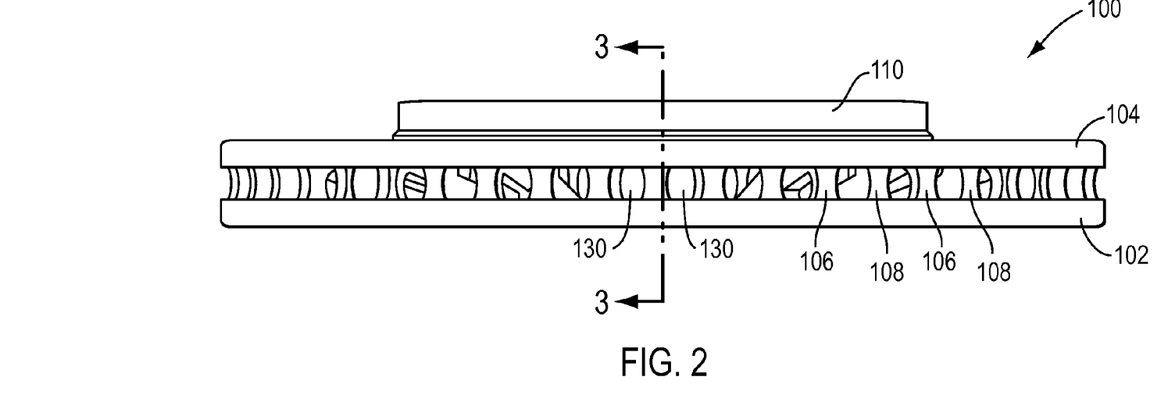
FIG. 2 is a side view of the brake rotor of FIG. 1.
Figure 3:
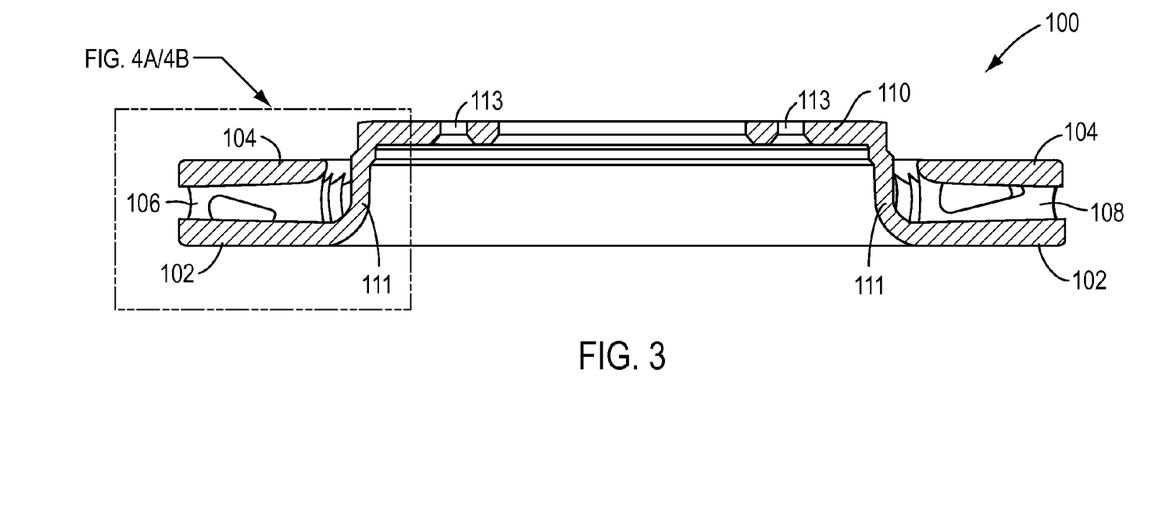
FIG. 3 is a cross-sectional view of the brake rotor of FIG. 1 taken through line 3-3 of FIG. 2.
Figure 5:
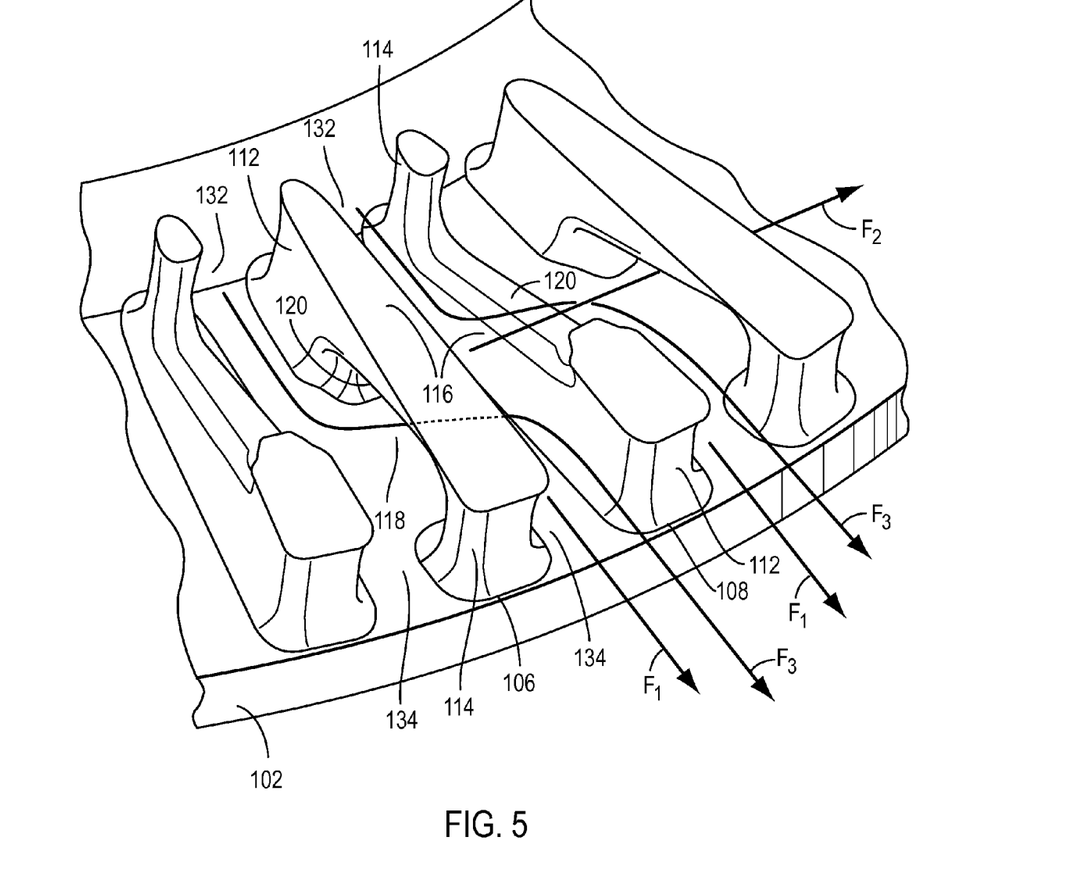
FIG. 5 is an enlarged, partial perspective view of the brake rotor of FIG. 1, with the inner friction member removed to show the fin elements.

As illustrated in FIGS. 1-3, in various embodiments of the present disclosure, the outer and inner friction members 102 and 104 may respectively comprise outer and inner annular disks, and the fin elements 106, 108 may extend radially between the outer and inner disks to create a plurality of ventilation channels 130 between the disks. In this manner, as shown in FIGS. 1 and 5, the fin elements 106, 108 are arranged so that, as the rotor 100 is rotated (e.g., when the rotor 100 is attached to a wheel of a motor vehicle), an air flow path $F_1$ is created within the ventilation channels 130 along a length of each fin element, 106, 108. In accordance with various embodiments, for example, as shown in FIG. 5, air inlets 132 to the ventilation channels 130 are provided at inner edges of the outer and inner friction members 102 and 104 so that the rotor 100 functions as a centrifugal fan driving air outwardly through the ventilation channels 130 to air outlets 134 at outer edges of the outer and inner friction members 102 and 104.

Figure 4A:
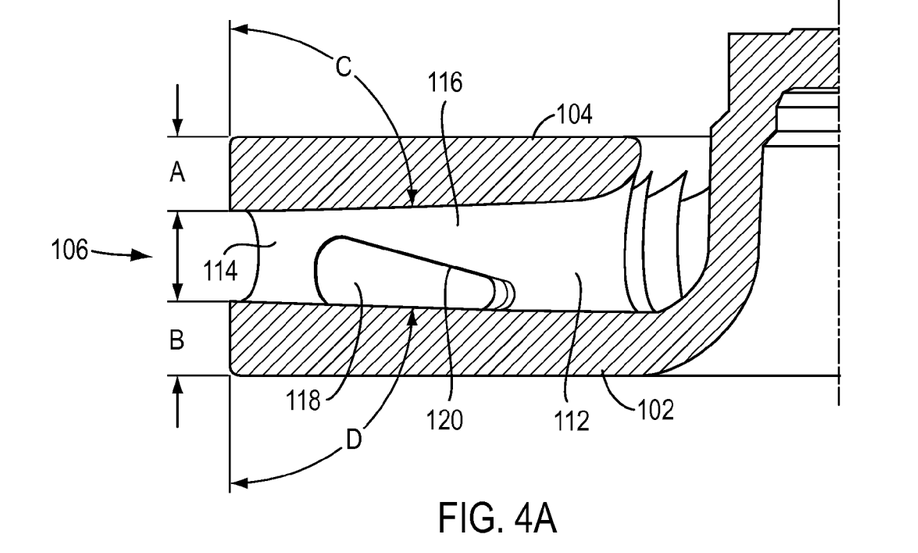
FIGS. 4A and 4B show detailed views of a fin element of the brake rotor of FIG. 1.
Figure 4B:
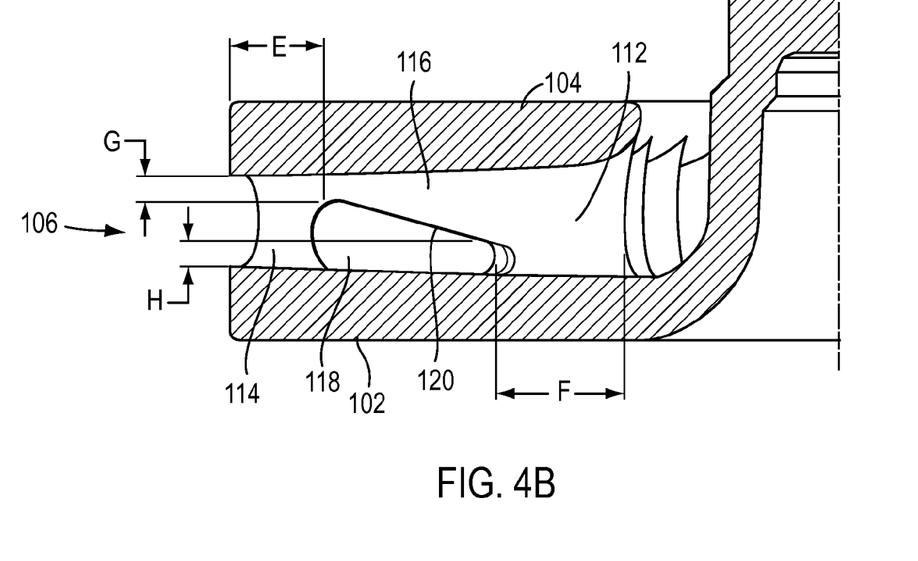

As shown best perhaps in FIGS. 4A, 4B, and 5, each of the fin elements 106, 108 includes respective first and second pillars 112 and 114 that are connected by a bridge portion 116. The pillars 112, 114 and bridge portion 116 define an arched-shaped opening 118 in each respective fin element 106, 108 that is configured to allow air (i.e., from the ventilation channels 130) to pass through the fin elements 106, 108. In various embodiments, for example, the bridge portion 116 forms a ramp 120 between the first and second pillars 112 and 114, such that the opening 118 has a rounded triangular shape. As shown in FIGS. 1 and 5, for example, the openings 118 in the fin elements 106, 108 are configured such that, as the rotor 100 is rotated (e.g., when the rotor 100 is attached to the wheel of the motor vehicle) an air flow path $F_2$ is created across a width of each fin element 106, 108. For example, in various embodiments, multiple airflow paths $F_2$ are created around the rotor 100, including, for example, a separate airflow path $F_2$ for each fin element 106, 108; and an airflow path $F_2$ that extends through multiple fin elements 106, 108 as shown in FIGS. 1 and 5. In this manner, turbulence is also created across the fin elements 106, 108 to dissipate heat from the rotor 100.

In other words, the fin elements 106, 108 are configured such that, as the rotor 100 is rotated, air flows partially within each ventilation channel 130 (along the airflow path $F_1$), and then partially though each opening 118 in the fin elements 106, 108 (along the airflow path $F_2$). The air flowing through the openings 118 (along the airflow path $F_2$) may then both partially continue through the adjacent openings 118 (i.e., around the rotor 100) and partially out through the adjacent ventilation channel 130. In this manner, the fin elements 106, 108 are configured such that, as the rotor 100 is rotated, an airflow path $F_3$ is also created that is a combination of airflow paths $F_1$ and $F_2$ (e.g., the airflow path $F_1$ may be extended by a length corresponding to the airflow path $F_2$) in order to dissipate more heat from the rotor 100.

As illustrated in FIGS. 1-5, in accordance with various exemplary embodiments, the plurality of fin elements may include first and second alternating fin elements 106 and 108 arranged around a rotation axis of the rotor 100, such that the bridge portion 116 of each first fin element 106 is coupled to the inner friction member 104 of the rotor 100 and the bridge portion 116 of each second fin element 108 is coupled to the outer friction member 102 of the rotor 100. The present disclosure, however, contemplates brake rotors including any number, configuration (i.e., dimension and/or geometry), and/or orientation of fin elements 106, 108. Those of ordinary skill in the art would understand, therefore, that the brake rotor 100 illustrated in FIGS. 1-5 is exemplary only and intended to illustrate one embodiment of the present disclosure. Accordingly, brake rotors in accordance with the present disclosure may have various configurations and/or orientations of friction members and fin elements without departing from the scope of the present disclosure and claims, and are not bound by any specific geometries and/or orientations.

Figure 9:
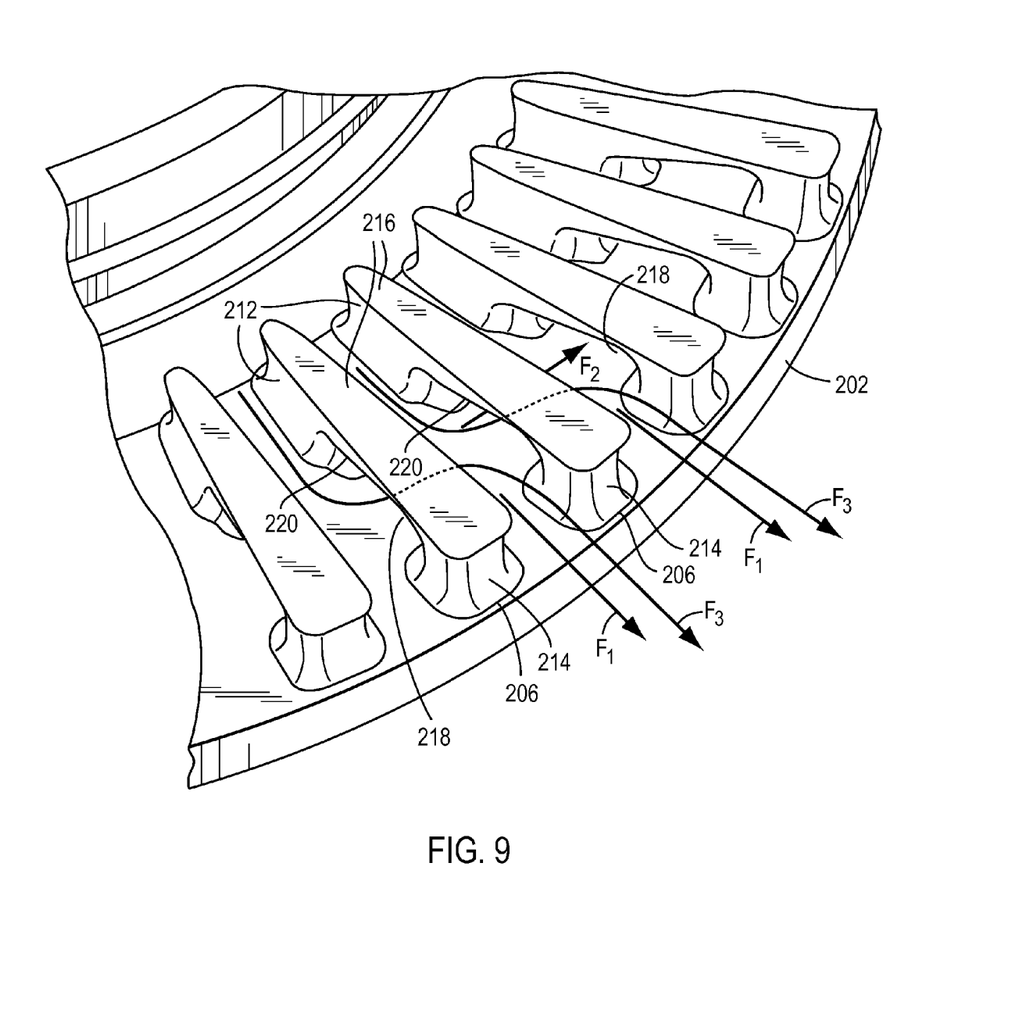
FIG. 9 is an enlarged, partial perspective view of the brake rotor of FIG. 6, with the inner friction member removed to show the fin elements.

For example, in accordance with various additional embodiments of the present disclosure, a ventilated brake rotor may include a plurality of fin elements all having the same orientation. As illustrated in FIGS. 6-9, for example, in various embodiments, a brake rotor 200 may include an outer friction member 202 that is connected to an inner friction member 204 by a plurality of fin elements 206 arranged around a rotation axis of the rotor 200 to create a plurality of ventilation channels 230. As shown in FIG. 9, similar to the embodiment of FIGS. 1-5, each of the fin elements 206 includes respective first and second pillars 212 and 214, which are connected by a bridge portion 216 to define an arched-shaped opening 218 in each fin element 206. And, in various embodiments, the bridge portions 216 each form a ramp 220 between respective first and second pillars 212 and 214.

Figure 6:
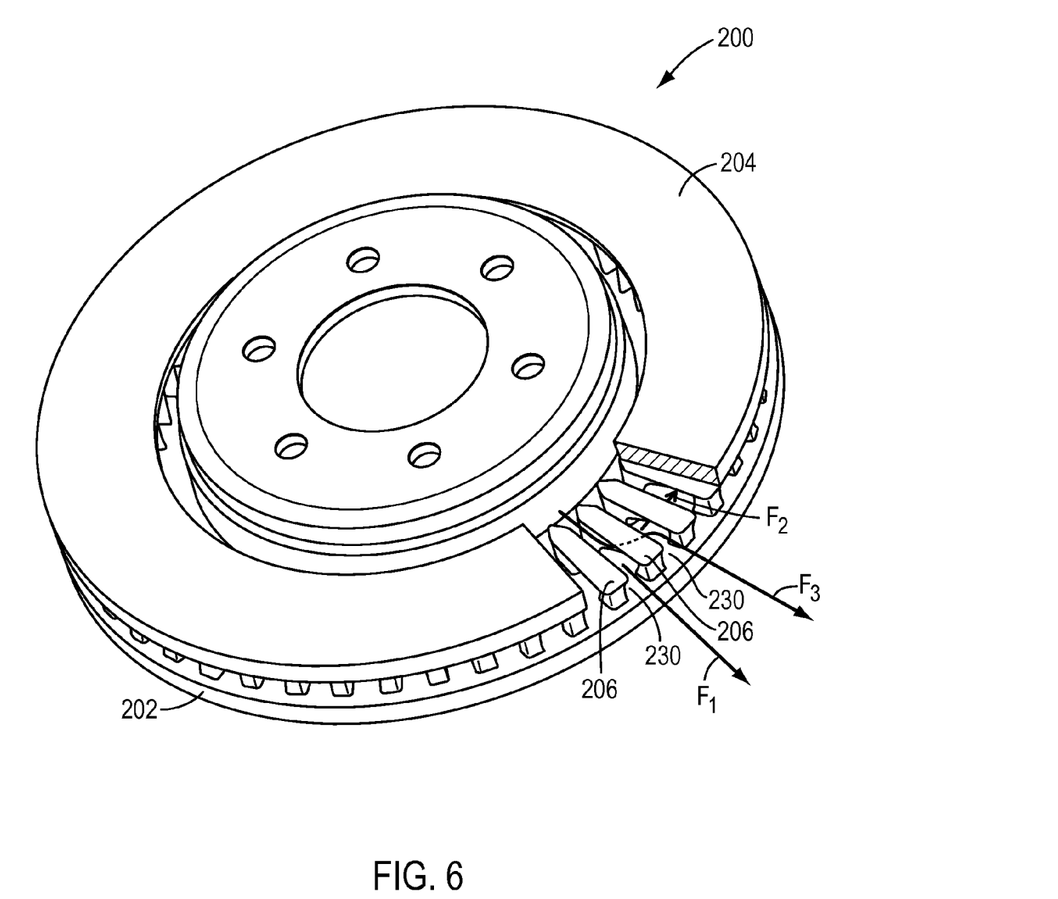
FIG. 6 is a perspective view of another exemplary embodiment of a ventilated brake rotor in accordance with the present disclosure, with a portion of an inner friction member of the rotor broken away to show fin elements.
Figure 7:
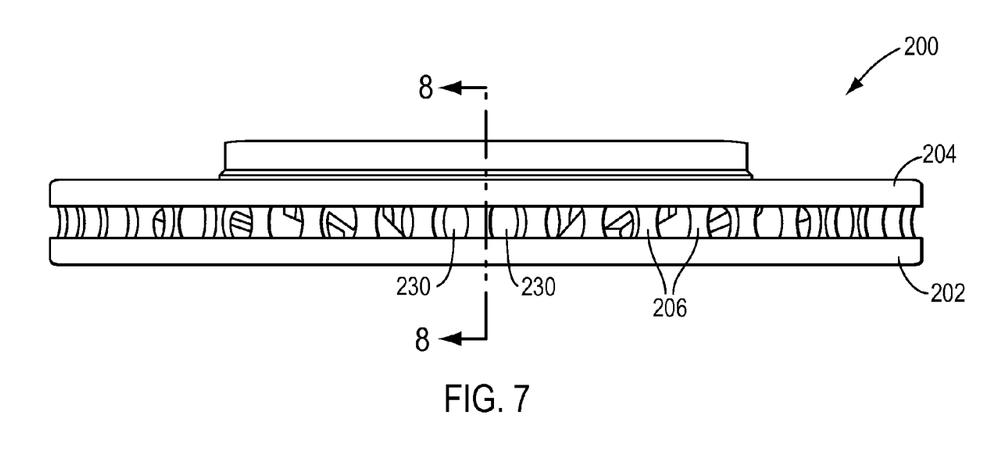
FIG. 7 is a side view of the brake rotor of FIG. 6.
Figure 8:
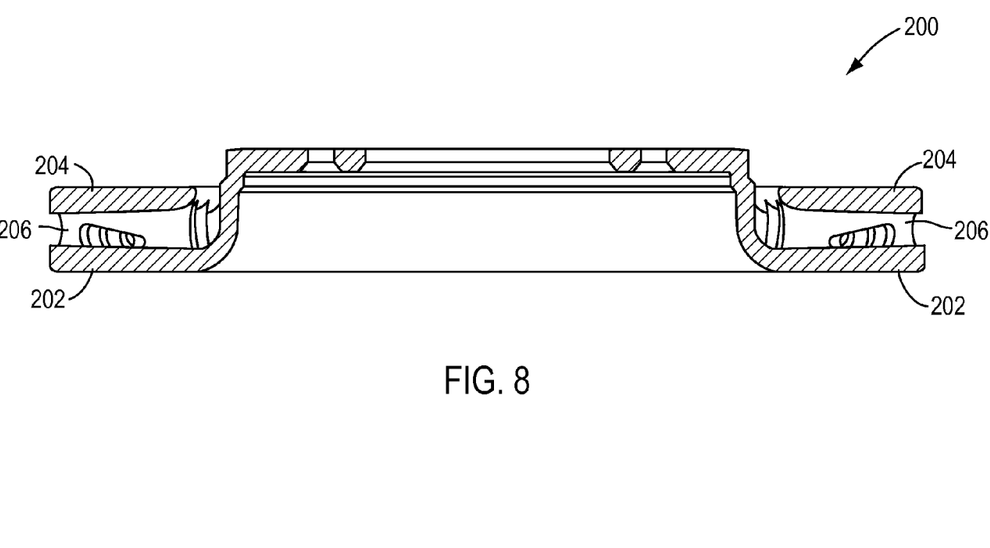
FIG. 8 is a cross-sectional view of the brake rotor of FIG. 6 taken through line 8-8 of FIG. 7.

Similar to the openings 118 described above, the openings 218 are configured to allow air (i.e., from the ventilation channels 230) to pass through the fin elements 206. Thus, similar to the rotor 100 of FIGS. 1-5, as the rotor 200 is rotated (e.g., when the rotor 200 is attached to a wheel of a motor vehicle), the fin elements 206 create an air flow path $F_1$ within the ventilation channels 230 along a length of each fin element 206, and the openings 218 in the fin elements 206 create an air flow path $F_2$ across a width of each fin element 206 to create turbulence across the fin elements 206. As above, in various embodiments, multiple airflow paths $F_2$ are created around the rotor 200, including, for example, a separate airflow path $F_2$ for each fin element 206; and an airflow path $F_2$ that extends through multiple fin elements 206 as shown in FIGS. 6 and 9.

Similar to the fin elements 106, 108, the fin elements 206 are also configured such that, as the rotor 200 is rotated, an airflow path $F_3$ is created that is a combination of airflow paths $F_1$ and $F_2$ (e.g., the airflow path $F_1$ may be extended by a length corresponding to the airflow path $F_2$) in order to dissipate more heat from the rotor 200.

In various embodiments, as shown in FIGS. 6-9, the bridge portion 216 of each fin element 206 is coupled to the inner friction member 204. Although not shown, those of ordinary skill in the art would understand that in various additional embodiments, the bridge portion 216 of each fin element 206 may instead be coupled to the outer friction member 202.

To verify and optimize the expected heat dissipation improvement and mass reduction of the ventilated brake rotors in accordance with the present disclosure versus conventional ventilated brake rotors, ventilated brake rotors in accordance with the present disclosure, similar to the brake rotors 100 (i.e., alternating fin elements) and 200 (i.e., one-way fin elements) illustrated and described above with reference to FIGS. 1-9 were modeled in a computational fluid dynamic (CFD) model using FLUENT® software. A reference conventional ventilated brake rotor was also modeled in a CFD model for comparison purposes. All CAD (Computer Aided Design) models were created using CATIA®.

Using the models, a design of experiment (DOE) was developed based on conventional manufacturing parameters (i.e., for molding the rotors) to test various rotor dimensions for optimization of: (1) mass flow rate of air through the fin elements, and (2) heat flux from the fin elements. Exemplary dimensions and tolerances A-H (see, e.g., FIGS. 4A and 4B) for the rotors 100 and 200 based on this analysis are presented below in Tables 1-3.

TABLE 1

Optimization of Mass Flow Rate

| Inner Friction Member Width, A [mm] | Outer Friction Member Width, B [mm] | Inner Friction Member Angle, C [deg] | Outer Friction Member Angle, D [deg] | Width of Second Pillar, E [mm] | Width of First Pillar, F [mm] | Height from Inner Friction Member to Ramp, G [mm] | Height from Outer Friction Member to Ramp, H [mm] | Predicted Max Mass Flow [kg/s] |
|---|---|---|---|---|---|---|---|---|
| 10.6 | 10.6 | 88 | 88 | 9.3 | 12.8 | 1.2 | 5.3 | 0.054 |

TABLE 2

Optimization of Mass Heat Flux

| Inner Friction Member Width, A [mm] | Outer Friction Member Width, B [mm] | Inner Friction Member Angle, C [deg] | Outer Friction Member Angle, D [deg] | Width of Second Pillar, E [mm] | Width of First Pillar, F [mm] | Height from Inner Friction Member to Ramp, G [mm] | Height from Outer Friction Member to Ramp, H [mm] | Predicted Max Heat Flux [kWatts] |
|---|---|---|---|---|---|---|---|---|
| 10.6 | 10.6 | 88 | 88 | 9.3 | 11.2 | 1.2 | 5.3 | 14.374 |

TABLE 3

Manufacturing Variations

| Inner Friction Member Width, A [mm] | Outer Friction Member Width, B [mm] | Inner Friction Member Angle, C [deg] | Outer Friction Member Angle, D [deg] | Width of Second Pillar, E [mm] | Width of First Pillar, F [mm] | Height from Inner Friction Member to Ramp, G [mm] | Height from Outer Friction Member to Ramp, H [mm] |
|---|---|---|---|---|---|---|---|
| +/−0.4 | +/−0.4 | +/−1 | +/−1 | +/−0.8 | +/−0.8 | +/−0.8 | +/−0.8 |

The heat dissipation and mass of the optimized models were then compared with the reference model (i.e., of the conventional ventilated brake rotor) to verify the expected heat dissipation improvement and mass reduction of each of the rotor designs (i.e., the alternating fin elements and the one-way fin elements). Based on this comparison, it was predicted that the rotors with alternating fin elements (i.e., rotor 100) would exhibit about 5.5% to about 8.3% more heat dissipation than the conventional rotor, and would weigh about 2.2% to about 12.3% less than the conventional rotor. Similarly, it was predicted that the rotors with one-way fin elements (i.e., rotor 200) would exhibit about 7% to about 9.8% more heat dissipation than the conventional rotor, and would weigh about 1.3% to about 11.3% less than the conventional rotor.

As above, the present disclosure contemplates brake rotors having various dimensions and/or orientations of friction members and fin elements. Accordingly, the above dimensions and tolerances are not intended to be limiting of the present disclosure or the scope of the invention herein. Rather, the dimensions and tolerances represent exemplary embodiments of the various components depicted. Those having ordinary skill in the art would understand that modifications to such dimensions and tolerances may be made as desired and in accordance with the present disclosure without departing from the scope of the present disclosure.

The present disclosure further contemplates methods of manufacturing a brake rotor, such as, for example, the brake rotors 100 and 200 described above with reference to FIGS. 1-9 in order to increase the convective heat dissipation of the rotor. In accordance with various exemplary embodiments, to increase the amount of heat dissipated from the brake rotor 100, 200, a plurality of fin elements 106, 108, 206 may be positioned between an outer friction member 102, 202 of the brake rotor 100, 200 and an inner friction member 102, 202 of the brake rotor 100, 200. As above, each fin element 106, 108, 206 includes first and second pillars 112, 212 and 114, 214 that are connected by a bridge portion 116, 216 to define a single arch-shaped opening 118, 218 in the fin element 106, 108, 206.

Thus, as the rotor 100, 200 is rotated (e.g., when the rotor 100, 200 is attached to a wheel of a motor vehicle), the fin elements 106, 108, 206 may create an air flow path $F_1$ along a length of each fin element 106, 108, 206 (i.e., within ventilation channels 130, 230), and the openings 118, 218 in the fin elements 106, 108, 206 may create an air flow path $F_2$ across a width of each fin element 106, 108, 206 to create turbulence across the fin elements 106, 108, 206. In various embodiments, for example, the openings 118, 218 in the fin elements 106, 108, 206 may create multiple airflow paths $F_2$ around the rotor 100, 200, including, for example, a separate airflow path $F_2$ for each fin element 106, 108, 206; and an airflow path $F_2$ that extends through multiple fin elements 106, 108, 206. In other words, in various embodiments, air flow moves partially within each ventilation channel 130, 230 (along an airflow path $F_1$), and then partially though each opening 118, 218 in the fin elements 106, 108, 206 (along an airflow path $F_2$). The air flowing through the openings 118, 218 (along the airflow path $F_2$) may then both partially continue through the adjacent openings 118, 218 (i.e., around the rotor 100, 200) and partially out through the adjacent ventilation channel 130, 230. In this manner, an airflow path $F_3$ is created that is a combination of airflow paths $F_1$ and $F_2$ (e.g., the airflow path $F_1$ may be extended by a length corresponding to the airflow path $F_2$) in order to dissipate more heat from the rotor 100, 200.

As shown in the embodiment of FIGS. 1-5, in various embodiments, the plurality of fin elements may include first and second alternating fin elements 106 and 108, and the fin elements 106 and 108 may be positioned between the outer and inner friction members 102 and 104 such that the bridge portion 116 of each first fin element 106 is coupled to the inner friction member 104 and the bridge portion 116 of each second fin element 108 is coupled to the outer friction member 102.

As shown in the embodiment of FIGS. 6-9, in various additional embodiments, the plurality of fin elements may include fin elements 206 with the same orientation, and the fin elements may be positioned between the outer and inner friction members 202 and 204 such that the bridge portion 216 of each fin element is coupled to the inner friction member 204. Although not shown, in various further embodiments, the fin elements 206 may also be positioned between the outer and inner friction members 202 and 204 such that the bridge portion 216 of each fin element is coupled to the outer friction member 202.

The brake rotors 100, 200 may be manufactured using any known methods and/or techniques known to those of ordinary skill in the art. In various embodiments, for example, the brake rotors 100, 200 may be cast from a molten metal, such as, for example, iron that is poured into a mold. In various additional embodiments, the brake rotors 100, 200 may be molded from a composited material, such as, for example, reinforced carbon-carbon, or a ceramic matrix composite.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, those of ordinary skill in the art would understand that the present teachings as disclosed would work equally well for any type of vehicle having a braking system that utilizes brake rotors.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A brake rotor, comprising:
   outer and inner friction members; and
   a plurality of fin elements connecting the outer friction member to the inner friction member, each fin element comprising radially spaced first and second pillars that are connected by a single bridge portion to define an opening in the fin element; and
   a hub mounting surface connected to the outer and/or inner friction member via a neck portion disposed along an inner portion of the brake rotor, the neck portion extending adjacent to the fin elements such that a space is formed between the neck portion and the fin elements,
   wherein a width of each fin element tapers toward a center of the brake rotor, and
   wherein the opening is defined by the first and second pillars, the bridge portion, and an interior surface of one of the friction members.

2. The brake rotor of claim 1, wherein the outer and inner friction members respectively comprise outer and inner annular disks, and wherein each fin element extends radially between the outer and inner disks.

3. The brake rotor of claim 1, wherein the plurality of fin elements includes first and second alternating fin elements, and
   wherein the bridge portion of each first fin element is coupled to the inner friction member and the bridge portion of each second fin element is coupled to the outer friction member.

4. The brake rotor of claim 1, wherein an orientation of each fin element is the same.

5. The brake rotor of claim 4, wherein the bridge portion of each fin element is coupled to the outer friction member.

6. The brake rotor of claim 4, wherein the bridge portion of each fin element is coupled to the inner friction member.

7. The brake rotor of claim 1, wherein the bridge portion forms a ramp between the first and second pillars.

8. The brake rotor of claim 1, wherein the opening has a straight side and a tapered side.

9. A brake rotor, comprising:
   outer and inner annular disks; and
   a plurality of fin elements extending radially between the annular disks and connecting the outer disk to the inner disk, each fin element comprising:
   first and second pillars disposed between the annular disks within an inner perimeter of each of the annular disks and an outer perimeter of each of the annular disks;
   a bridge portion connecting the first and second pillars such that a lengthwise direction of the bridge portion extends radially from a center of the brake rotor to an outer perimeter of the brake rotor; and
   an opening,
   wherein the opening is defined by the first and second pillars, the bridge portion, and an interior surface of one of the annular disks.

10. The brake rotor of claim 9, wherein the opening has a straight side and a tapered side.

11. The brake rotor of claim 9, wherein each fin element further comprises a radially inner edge and a radially outer edge, and wherein a width of each fin element narrows from the radially outer edge to the radially inner edge.

12. The brake rotor of claim 9, wherein the plurality of fin elements includes first and second alternating fin elements, and
   wherein the bridge portion of each first fin element is coupled to the inner disk and the bridge portion of each second fin element is coupled to the outer disk.

13. The brake rotor of claim 9, wherein the bridge portion of each fin element is coupled to the outer disk.

14. The brake rotor of claim 9, wherein the bridge portion of each fin element is coupled to the inner disk.

15. A brake rotor, comprising:
   a plurality of fin elements disposed between outer and inner friction members of the brake rotor such that a lengthwise direction of each fin extends radially from a center of the brake rotor, each fin element comprising an opening such that a lengthwise direction of the opening extends radially, a height and width of the opening being tapered along an entire length between a first pillar and a second pillar.

16. The brake rotor of claim 15, wherein the opening has a tapered side.

17. The brake rotor of claim 15, wherein the opening has a straight side.

18. The brake rotor of claim 15, wherein a width of each fin element narrows along the lengthwise direction towards the center of the brake rotor.

19. The brake rotor of claim 15, wherein:
   the first and second pillars are connected by a bridge portion to define the opening in each fin element,
   each bridge portion extends from an interior surface of one of the friction members, and
   each opening is further defined by an opposing interior surface of the other of the friction members.

20. The brake rotor of claim 19, wherein the plurality of fin elements includes first and second alternating fin elements, and
   wherein the bridge portion of each first fin element is coupled to the inner friction member and the bridge portion of each second fin element is coupled to the outer friction member.

21. The brake rotor of claim 19, wherein the bridge portion of each fin element is coupled to the inner friction member.

22. The brake rotor of claim 19, wherein the bridge portion of each fin element is coupled to the outer friction member.

* * * * *